US012675351B2

(12) United States Patent (10) Patent No.: US 12,675,351 B2
Kitawaki (45) Date of Patent: Jul. 7, 2026

(54) OPERATION MANAGEMENT APPARATUS, OPERATION MANAGEMENT METHOD, AND OPERATION MANAGEMENT PROGRAM

(71) Applicant: Hitachi, Ltd., Tokyo (JP)

(72) Inventor: Jun Kitawaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/809,735

(22) Filed: Aug. 20, 2024

(65) Prior Publication Data

US 2025/0298681 A1 Sep. 25, 2025

(30) Foreign Application Priority Data

Mar. 25, 2024 (JP) ................................. 2024-047746

(51) Int. Cl.
| | |
|---|---|
| *G06F 11/00* | (2006.01) |
| *G06F 11/07* | (2006.01) |
| *H04L 67/02* | (2022.01) |

(52) U.S. Cl.
CPC ........ *G06F 11/0709* (2013.01); *G06F 11/079* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 10,437,712 B1* | 10/2019 | Tyler ................... | G06F 11/3684 |
| 2011/0283359 A1* | 11/2011 | Prince ................ | G06Q 30/0241 |
| | | | 726/23 |

| | | | |
|---|---|---|---|
| 2015/0350143 A1* | 12/2015 | Yang ..................... | G06F 3/0482 |
| | | | 345/173 |
| 2017/0177596 A1* | 6/2017 | Comstock ............... | H04L 51/52 |
| 2018/0357154 A1* | 12/2018 | Dolby ................. | G06F 11/3684 |
| 2021/0216442 A1* | 7/2021 | Bhadani ............. | G06F 11/3684 |
| 2021/0279609 A1 | 9/2021 | Kikawada | |
| 2023/0251956 A1* | 8/2023 | Dockter .............. | G06F 11/3688 |
| | | | 714/38.1 |
| 2023/0418727 A1* | 12/2023 | Daunais .............. | G06F 11/3612 |
| 2024/0004743 A1* | 1/2024 | Pole .................... | G06F 11/0784 |

FOREIGN PATENT DOCUMENTS

| | | |
|---|---|---|
| JP | 2018-46422 A | 3/2018 |
| JP | 2021-140308 A | 9/2021 |

* cited by examiner

*Primary Examiner* — Bryce P Bonzo
*Assistant Examiner* — Gabriella Kanani Shelton
(74) *Attorney, Agent, or Firm* — Procopio, Cory, Hargreaves & Savitch LLP

(57) ABSTRACT

In an operation management apparatus that manages an operation of a system that provides a service requesting processing from an external service via an application programming interface (API), a storage device stores test data for causing the external service to execute processing via the API, the external service that a user uses through the service, and a correspondence relationship between the external service and the API that the user uses the processor is configured to detect whether or not a failure has occurred on the external service side, confirm whether or not the failure on the call destination service side is reproduced via an API used when the failure occurred, using the test data in a case of detecting the failure and specify a user who uses the external service and the API used, in a case where the failure on the external service side is reproduced.

15 Claims, 13 Drawing Sheets

311

| USER ID | USER NAME | TRANSMISSION SOURCE |
|---------|-----------|---------------------|
| 1 | USER 1 | xxx.xxx.xxx |
| 2 | USER 2 | yyy.yyy.yyy |
| 3 | USER 3 | zzz.zzz.zzz |

312

| EXTERNAL SERVICE ID | EXTERNAL SERVICE NAME | URL |
|---------------------|-----------------------|-----|
| 1 | ○○ SERVICE | https://xxx... |
| 2 | ◇◇ SERVICE | https://yyy... |
| 3 | □□ SERVICE | https://zzz... |

313

| MICROSERVICE ID | MICROSERVICE NAME | EXTERNAL SERVICE ID |
|-----------------|-------------------|---------------------|
| 1 | A | -1 |
| 2 | B | -1 |
| 3 | C | -1 |
| 4 | D | 1, 2, 3 |
| 5 | E | -1 |
| 6 | F | 4 |

| EXTERNAL SERVICE ID | API | TYPE |
|---|---|---|
| 1 | API1 | POST |
| 1 | API2 | GET |
| 1 | API3 | PUT |
| 2 | API1 | GET |
| 2 | API4 | GET |
| ... | | |

| USER ID | EXTERNAL SERVICE ID | API | RESULT | LATEST USAGE TIME | CURRENT USAGE |
|---------|---------------------|------|--------|-------------------|---------------|
| 1 | 1 | API1 | 2 0 0 | 2023/12/01 09:30:58 | T R U E |
| 1 | 1 | API2 | 5 0 0 | 2023/12/01 09:31:00 | T R U E |
| 2 | 2 | API3 | 2 0 0 | 2023/12/01 09:05:45 | T R U E |
| 3 | 1 | API1 | 2 0 0 | 2023/11/30 21:50:10 | T R U E |
| 4 | 3 | API4 | 4 0 0 | 2023/12/01 08:30:00 | T R U E |
| 2 | 1 | API1 | 2 0 0 | 2023/11/30 19:58:20 | F A L S E |
| 5 | 1 | API3 | 2 0 0 | 2023/12/01 09:35:20 | F A L S E |
| ... | | | | | |

| EXTERNAL SERVICE ID | API | USER ID | REQUEST TIME | RESULT | TEST TIME |
|---|---|---|---|---|---|
| 1 | API2 | 1 | 2023/12/01 09:31:00 | 5 0 0 | 2023/12/01 09:31:01 |
| 1 | API2 | 3 | 2023/12/01 09:31:01 | 5 0 0 | 2023/12/01 09:31:01 |
| 1 | API3 | 3 | 2023/12/01 10:01:10 | 2 0 0 | 2023/12/01 10:01:11 |
| 2 | API4 | 2 | 2023/06/30 17:10:15 | 5 0 0 | 2023/06/30 17:10:16 |
| 3 | API5 | 7 | 2023/11/15 11:58:20 | 5 0 0 | 2023/11/15 11:58:21 |
| ... | | | | | |

*FIG. 8*

| EXTERNAL SERVICE ID | API | TYPE | MICROSERVICE | INTRA-COMPANY ERROR | AFFECTED USER | ESTIMATED INFLUENCE RANGE |
|---|---|---|---|---|---|---|
| 1 | API1 | POST | 1 | FALSE | – | |
| 1 | API2 | GET | 1 | FALSE | 1 | 3, 4, . . . |
| 1 | API3 | GET | 1 | FALSE | 3 | |
| 2 | API4 | GET | 1 | TRUE | 2, 5, 6 | |

1001   1002   1003   1004   1005   1006   1007

318

OPERATION MANAGEMENT APPARATUS, OPERATION MANAGEMENT METHOD, AND OPERATION MANAGEMENT PROGRAM

CROSS-REFERENCE TO RELATED APPLICATIONS

This application claims priority from JP 2024-047746, filed Mar. 25, 2024. The entire content of the priority application is incorporated herein by reference.

TECHNICAL FIELD

The present disclosure relates to an operation management technology of a system that provides a plurality of users with a provision service that requests processing from a service via an application programming interface (API).

BACKGROUND ART

A cloud-native application that updates a system in a short period of time by combining a public cloud and a small service called a microservice and continues update has become widespread. As a result,, a trend is shifting from a conventional operation in which an application developed on a stable Internet technology (IT) infrastructure is continuously used without being updated as long as the application continues stable operation to an operation in which open source software (OSS) or commercial Software as a Service (SaaS) is actively incorporated and a system is continued to be locally updated frequently not only for achievement of a new customer demand but also failure handling.

The cloud-native application provides a mechanism that can withstand a failure such as abnormal termination of a service or a high load, which is one of causes of the failure, by redundant configuration or automatic scaling of an important microservice. However, in a case where a service behaves abnormally due to a defect of a code, it is required to find a cause at an early stage, handle the cause if the cause can be handled by the company, grasp that a failure not caused by the company has occurred if the cause is commercial SaaS that cannot be handled by an own company, and notify the user.

PTL 1 discloses a technology of predicting an influence of a service provided by another company on an own system by learning a relationship between a post regarding failure information of a service provided by another company posted on a social network service (SNS) and a failure of the own system.

PTL 2 discloses a technology of holding a service used for each user, access history information, and a failure history for each service, and suppressing unnecessary notification by not notifying, of failure information, a user who is considered not to use the service by a service recovery time estimated at the time of occurrence of a service failure.

CITATION LIST

Patent Literature

PTL 1: JP 2021-140308 A
PTL 2: JP 2018-46422 A

SUMMARY OF INVENTION

Technical Problem

However, PTL 1 is applied to a system in which failure information is posted on an SNS, but cannot be applied to a system that is otherwise. There is a case where it can be detected that a failure has occurred in a service provided by another company, but whether the failure affects the entire service users or only some users who use a specific function in the service is not considered.

In PTL 2, the users to be notified of the failure information are narrowed down from the viewpoint of whether to use a service in which a failure has occurred by a failure recovery estimation time, but which user is affected when the failure occurs in some services used in the service is not considered at all.

The present disclosure has been made in view of the above circumstances, and an object of the present disclosure is to provide a technology that can appropriately estimate a user who can be affected in a case where a failure occurs in a service for which processing is required from a service provided to the user.

Solution to Problem

In order to achieve the above object, an operation management apparatus according to one viewpoint is an operation management apparatus that manages an operation of a system that provides a plurality of users with a provision service that requests processing from one or more call destination services via an application programming interface (API), the operation management apparatus, including: one or more processors; and a storage device, wherein the storage device stores test data for causing the call destination service to execute processing via the API, a call destination service that a user uses through the provision service, and a correspondence relationship between the call destination service and an API that the user uses, and the processor detects whether or not a failure has occurred on a call destination service side in the provision service for a predetermined user, executes, in a case of detecting the failure on the call destination service side, a confirmation test for confirming whether or not the failure on the call destination service side is reproduced via an API used when the failure occurred, using the test data, and specifies a user who uses the call destination service and the API used, in a case where the failure on the call destination service side is reproduced as a result of the confirmation test.

Advantageous Effects of Invention

According to the present disclosure, a technology that can appropriately estimate a user who can be affected in a case where a failure occurs in a service for which processing is required from a service provided to the user is provided.

BRIEF DESCRIPTION OF DRAWINGS

FIG. 5 is a configuration diagram of an example of an external service API table according to one embodiment.

FIG. 6 is a configuration diagram of an example of an API usage status table according to one embodiment.

FIG. 7 is a configuration diagram of an example of a confirmation test table according to one embodiment.

FIG. 8 is a configuration diagram of an example of an influence range estimation table according to one embodiment.

DESCRIPTION OF EMBODIMENTS

An embodiment will be described with reference to the drawings. The embodiment described below does not limit the invention according to claims, and not all of the elements and combinations thereof described in the embodiment are essential to the solution of the invention.

In the following description, information may be described with an expression of "xxx table", but the information may be expressed with any data structure. In order to indicate that information does not depend on the data structure, "xxx table" can be called "xxx information".

In the following description, there is a case where processing is described with "program" as an acting subject, but the subject of processing may be a processor (alternatively, a computer having a processor or a computer system) because when executed by the processor, the program performs determined processing while appropriately using a storage device and/or an interface. The program may be installed into the computer from a program source. The program source may be, for example, a program distribution server or a storage medium readable by a calculator. In the description below, two or more programs may be implemented as one program, or one program may be implemented as two or more programs. At least a part of the processing implemented by executing a program may be implemented by a hardware circuit (e.g., an application specific integrated circuit (ASIC) or a field-programmable gate array (FPGA)).

Figure 1:
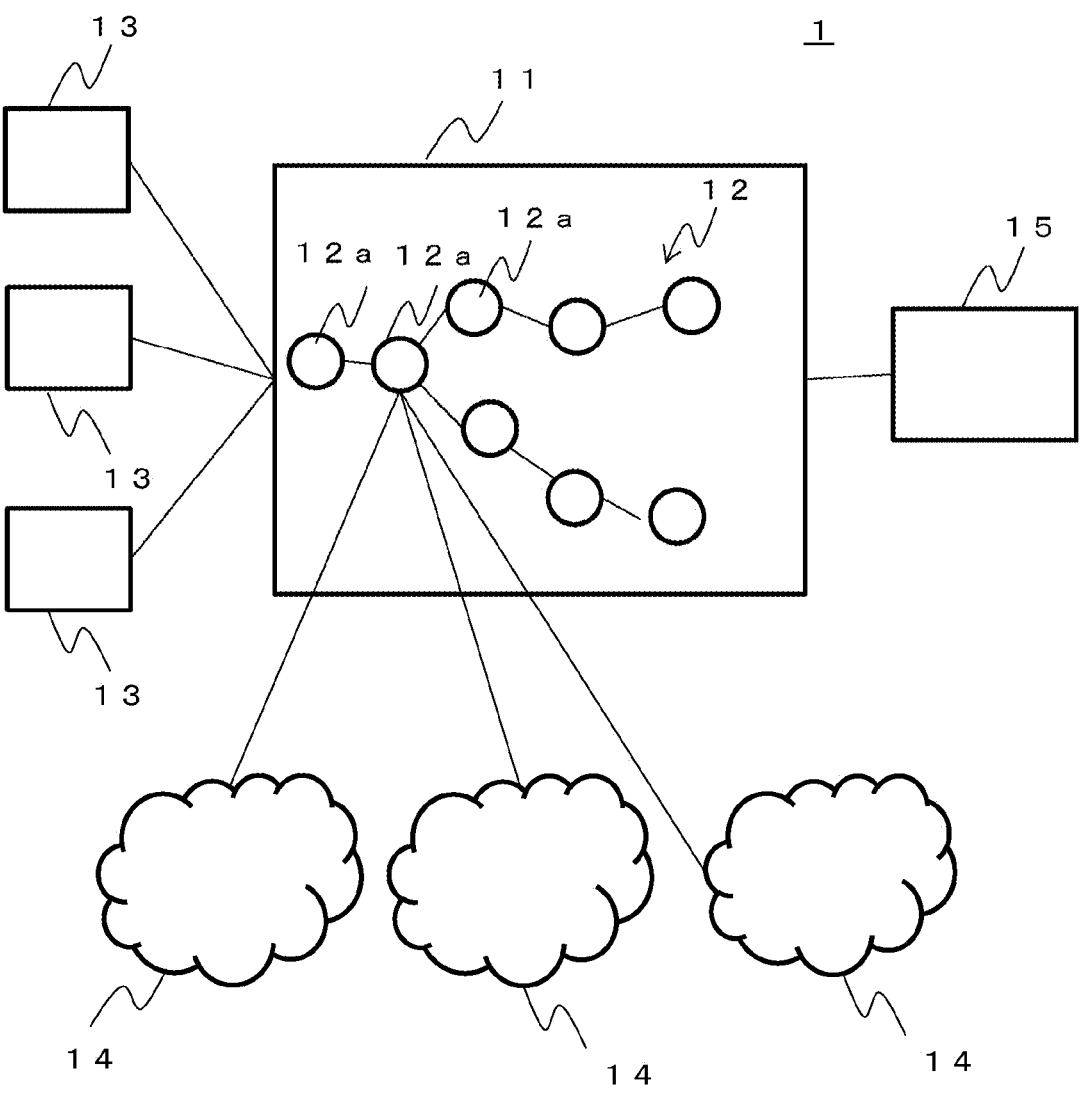
FIG. 1 is an overall configuration diagram of a computer system according to one embodiment.

FIG. 1 is an overall configuration diagram of a computer system according to one embodiment.

A computer system 1 includes a plurality of user terminals 13, a system 11, a plurality of external services 14, and an operation management apparatus 15. These parts are communicably connected by a network not illustrated, for example.

The system 11 includes a server of a public cloud, for example. The system 11 provides a plurality of users with a service 12 (provision service). The service 12 includes, for example, a plurality of microservices 12a. The microservice 12a communicates with another microservice 12a by using a hyper text transfer protocol (HTTP) or a hypertext transfer protocol secure (HTTPS). In the service 12, each user can achieve a service desired by the user, for example, by combining the microservices 12a necessary for each user.

The user terminal 13 is a terminal used by the user, and uses the service 12 provided by the system 11. Some users use the external service 14 by calling an API that uses the external service 14 in the service 12.

The external service 14 is an example of a call destination service, executes predetermined processing in response to a request transmitted via the API, and returns a processing result to the service 12. In the present embodiment, the external service 14 is provided by a third party different from a provider (management entity) that provides the service 12, and the provider of the service 12 cannot grasp details of the processing of the external service 14. However, the external service may be a service provided by the provider of the service 12.

The operation management apparatus 15 executes processing of performing operation management of the service 12 in the system 11.

Figure 2:
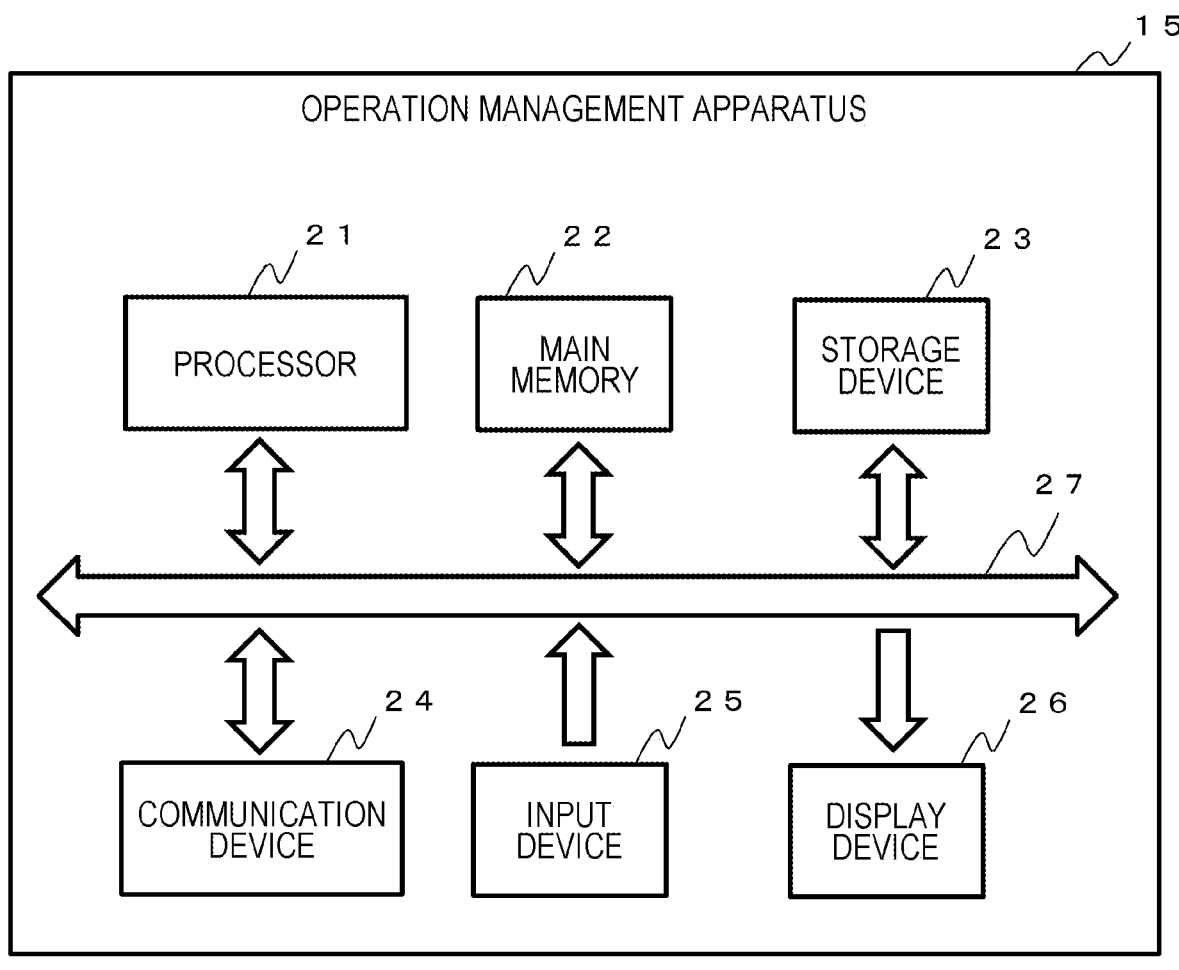
FIG. 2 is a hardware configuration diagram of an operation management apparatus according to one embodiment.

FIG. 2 is a hardware configuration diagram of the operation management apparatus according to one embodiment.

The operation management apparatus 15 is configured by, for example, a computer such as a personal computer (PC) or a general-purpose server, and includes a processor 21, a main memory 22, a storage device 23, a communication device 24, an input device 25, and a display device 26. Each of the parts 21 to 26 are connected via a bus 27.

The processor 21 is, for example, a central processor unit (CPU), and executes a program read from the storage device 23 to the main memory 22, thereby configuring each function of executing various processing necessary for operation management of the system 11 (service 12).

The main memory 22 is, for example, a random access memory (RAM), and stores a program executed by the processor 21 and necessary information.

The storage device 23 is, for example, a hard disk, a flash memory, or the like, and stores a program executed by the processor 21 and data used by the processor 21.

The communication device 24 is, for example, an interface such as a wired LAN card or a wireless LAN card, and communicates with the user terminal 13, the system 11, the external service 14, and the like via a network.

The input device 25 is, for example, a mouse, a keyboard, or the like, and receives an input of information by an operation manager. The input device 25 receives, for example, an input of information to be set in a table stored in the storage device 23.

The display device 26 is, for example, a display, and displays and outputs various screens including an execution result of processing by the processor 21.

Figure 3:
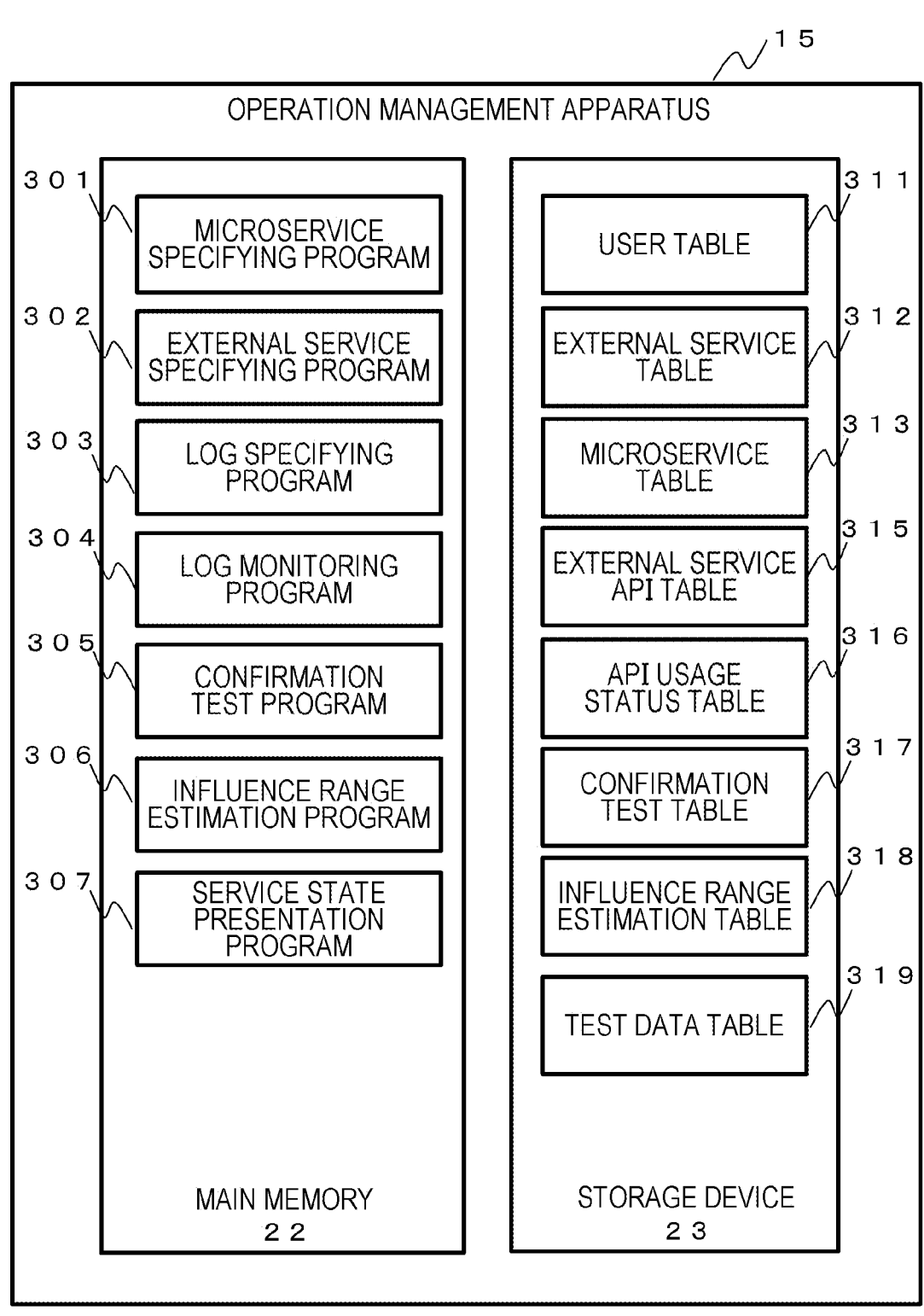
FIG. 3 is a view describing configurations of a main memory and a storage device of the operation management apparatus according to one embodiment.

FIG. 3 is a view describing configurations of the main memory and the storage device of the operation management apparatus according to one embodiment.

The main memory 22 stores a microservice specifying program 301, an external service specifying program 302, a log specifying program 303, a log monitoring program 304, a confirmation test program 305, an influence range estimation program 306, and a service state presentation program 307.

By being executed by the processor 21, the microservice specifying program 301 performs processing of specifying the microservice 12*a* that calls the external service 14 from the service 12 constituting the system 11. By being executed by the processor 21, the external service specifying program 302 performs processing of specifying the external service 14 to be called by the system 11.

By being executed by the processor 21, the log specifying program 303 specifies a log monitored by the operation management apparatus 15. By being executed by the processor 21, the log monitoring program 304 performs processing of monitoring the usage status of the external service 14 and a presence or absence of a failure occurrence from the log of a monitored target.

By being executed by the processor 21, the confirmation test program 305 performs processing of confirming the reproducibility of a failure of the external service 14. By being executed by the processor 21, the influence range estimation program 306 executes processing of estimating a user affected by a failure from a failure status of the external service 14. By being executed by the processor 21, the service state presentation program 307 executes processing of presenting the state of the service 12 provided by the system 11.

The storage device 23 stores a user table 311, an external service table 312, a microservice table 313, an external service API table 315, an API usage status table 316, a confirmation test table 317, an influence range estimation table 318, and a test data table 319.

The user table 311 stores information on a user who uses the service 12 provided by the system 11. The external service table 312 stores information on the external service 14 used by the system 11. The microservice table 313 stores information on the microservice 12*a* that calls the external service 14 in the microservice 12*a* constituting the system 11. The external service API table 315 stores an operation type of an API called in the external service 14. The API usage status table 31 stores the latest usage status of the API of the external service 14. The confirmation test table 317 stores information regarding a confirmation test for confirming the reproducibility of an occurrence of a failure. The influence range estimation table 318 stores information on a failure of a service provided by the system 11 and a user affected by the failure. The test data table 319 stores test data used when calling the external service 14 via the API. This test data is data used to confirm that the external service 14 is normally operating at the time of development of the microservice 12*a*, for example, and is data (combination of arguments and the like) that has been successfully confirmed to be normal, that is, data that has been successfully passed the confirmation test.

Next, various tables stored in the storage device 23 will be described in detail.

Figure 4A:
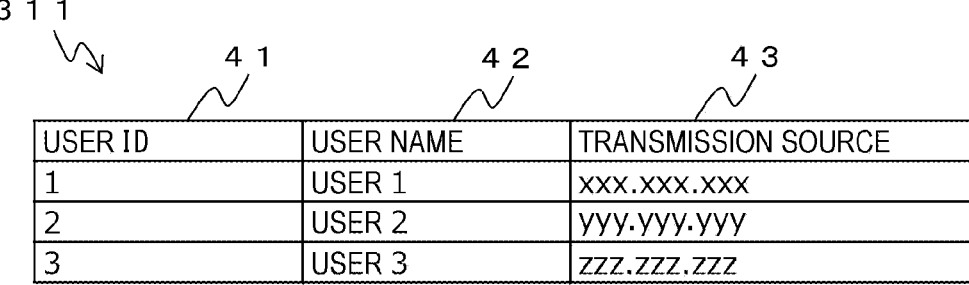
FIG. 4A is a configuration diagram of an example of a user table according to one embodiment.

FIG. 4A is a configuration diagram of an example of a user table according to one embodiment.

The user table 311 stores a row (entry) for each user. The row of the user table 311 includes fields of a user ID 41, a user name 42, and a transmission source 43.

The user ID 41 stores a unique identifier (user ID) allocated to each user. The user name 42 stores the user name of a user corresponding to the row. The transmission source 43 stores transmission information such as an IP address and a host name that can identify the user terminal 13 when the user corresponding to the row uses the service 12. Various types of information of the user table 311 can be acquired from a table not illustrated that manages user information having a use contract for the service 12 provided by the system 11, for example, a table managed by an external device not illustrated in FIG. 1.

Figure 4B:
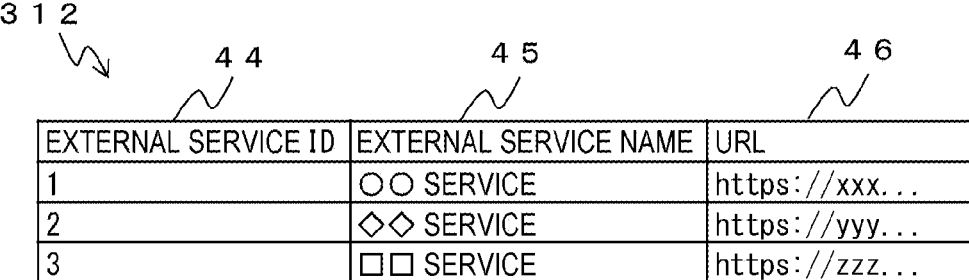
FIG. 4B is a configuration diagram of an example of an external service table according to one embodiment.

FIG. 4B is a configuration diagram of an example of an external service table according to one embodiment.

The external service table 312 stores a row for each external service. The row of the external service table 312 includes fields of an external service ID 44, an external service name 45, and a URL 46.

The external service ID 44 stores a unique identifier (external service ID) allocated to an external service corresponding to the row. The external service ID is described in a design document created at the time of development of the system 11, for example. The external service name 45 stores the name (external service name) of an external service corresponding to the row. The URL 46 stores a URL that is an access destination when the external service corresponding to the row is used. The external service table 312 is created by the external service specifying program 302. The external service specifying program 302 acquires an external service ID, a service name, and a URL for an external service from a device not illustrated, for example, and stores them into the external service table 312.

Figure 4C:
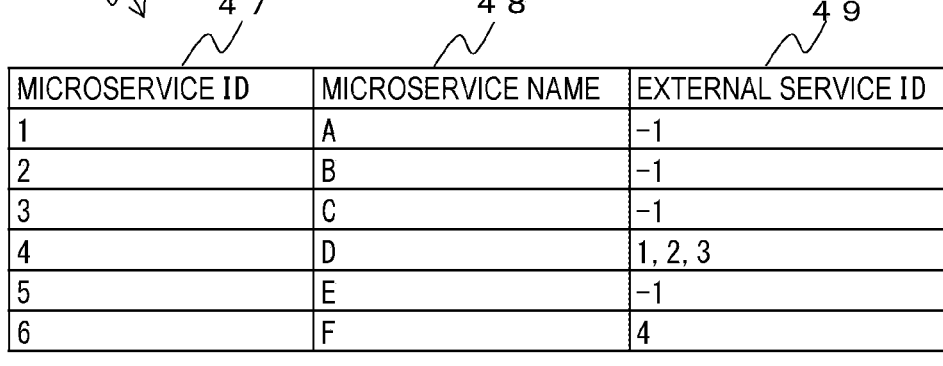
FIG. 4C is a configuration diagram of an example of a microservice table according to one embodiment.

FIG. 4C is a configuration diagram of an example of a microservice table according to one embodiment.

The microservice table 313 stores a row for each microservice 12*a* constituting the service 12. The row of the microservice table 313 includes fields of a microservice ID 47, a microservice name 48, and an external service ID 49.

The microservice ID 47 stores an identifier (microservice ID) that uniquely identifies the microservice 12*a* corresponding to the row. The microservice name 48 stores the name (microservice name) of the microservice 12*a* corresponding to the row. The external service ID 49 stores the external service ID of an external service called by the microservice 12*a* corresponding to the row. The external service ID 49 stores, in a case where the microservice 12*a* corresponding to the row calls a plurality of external services, a character string in which external service IDs of the plurality of external services to be called are separated by commas, and stores, in a case where the microservice 12*a* corresponding to the row does not call an external service, a value that does not overlap the external service ID, for example, "−1". The microservice table 313 is created by the microservice specifying program 301 acquiring various types of information regarding the microservice from a device not illustrated in FIG. 1, for example.

FIG. 5 is an example of the configuration of the external service API table 315.

The external service API table 315 stores an external service and a row for each API that calls the external service. The row of the external service API table 315 includes fields of an external service ID 53, an API 54, and a type 55.

The external service ID 53 stores the external service ID of an external service corresponding to the row. The API 54 stores information (e.g., the name of an API) specifying the function of the API used to call the external service corresponding to the row. The API 54 stores, for example, "GetVersion", which is an API for acquiring version information provided by an external service, "auth", which is an API for acquiring a dedicated token when authentication of a user who uses an external service is successful, and the like, but is simply expressed as API 1, API 2, . . . , or the like in the example of FIG. 5. The type 55 stores the type of an operation when an API corresponding to the row calls an external service. For example, in a case where the external service corresponds to a method called a representational state transfer (REST) API, the type 55 stores "POST"

indicative of being a function of new creation, "GET" indicative of being a reference-related function, "PUT" indicative of being an update-related function, "DELETE" indicative of being a delete-related function, and the like. A creation method of the external service API table 315 will be described later.

FIG. 6 is a configuration diagram of an example of the API usage status table according to one embodiment.

The API use state table 316 stores a row for each use of the API by the user. According to this API use state table 316, the correspondence relationship between the user and the external service and the API used is managed. The row of the API usage status table 316 includes fields of a user ID 61, an external service ID 62, an API 63, a result 64, a latest usage time 65, and current usage 66.

The user ID 61 stores an identifier (user ID) that uniquely identifies a user who uses the API corresponding to the row. The external service ID 62 stores the external service ID of the external service 14 used by the user having the user ID 61 corresponding to the row. The API 63 stores the function of the API called (used) when the user having the user ID corresponding to the row uses the external service. The result 64 stores a result (return value or states code) when the API corresponding to the row is called. The status code stored in the result 64 is "200" in a case of being normal, for example, is 500s in a case of being an error on the external service side, and is 400s in a case of being an error on the side of request to the API. The latest use time 65 stores the latest time at which the external service and API corresponding to the row are used. The current usage 66 stores information indicating whether or not the user having the user ID corresponding to the row is in a state of currently using the external service corresponding to the row. The current usage 66 stores "TRUE" in a case where the user is in a state of currently using the external service, and "FALSE" in a case where the user is not in a state of currently using the external service, that is, in a state of currently using another external service.

FIG. 7 is a configuration diagram of an example of the confirmation test table according to one embodiment.

The confirmation test table 317 stores a row for a set of an external service that is a target of a confirmation test and an API. The row of the confirmation test table 317 includes fields of an external service ID 81, an API 82, a user ID 83, a request time 84, a result 85, and a test time 86.

The external service ID 81 stores the external service ID of an external service corresponding to the row. The API 82 stores the function of the API corresponding to the row. The user ID 83 stores the user ID of a user who uses the external service and the API corresponding to the row. The request time 84 stores the time at which a request of the confirmation test is made to the API corresponding to the row. The result 85 stores a result of a test of failure reproducibility in a case where a request is made to the external service corresponding to the row via the API. The test time 86 stores the time at which the test of failure reproducibility is performed.

FIG. 8 is a configuration diagram of an example of the influence range estimation table according to one embodiment.

The influence range estimation table 318 stores a row for each failure for which reproducibility of the failure has been confirmed. The row of the influence range estimation table 318 includes fields of an external service ID 1001, an API 1002, a type 1003, a microservice 1004, an intra-company error 1005, an affected user 1006, and an estimated influence range 1007.

The external service ID 1001 stores the external service ID of an external service involved in a failure corresponding to the row. The API 1002 stores the function of the API involved in a failure corresponding to the row. The type 1003 stores the type of an operation when the API calls the external service in a failure corresponding to the row. The microservice 1004 stores the microservice ID of a microservice that has called the external service involved in a failure corresponding to the row. The intra-company error 1005 stores information indicating whether or not a failure corresponding to the row is a failure caused in the service 12. The intra-company error 1005 stores "TRUE" if the failure is a failure caused in the service 12, and "FALSE" if the failure is not a failure caused in the service 12. The affected user 1006 stores the user ID of a user affected by a failure corresponding to the row. The estimated influence range 1007 stores an influence range estimated to be affected by a failure corresponding to the row, for example, a user ID or a set of user IDs of users estimated to be affected.

Next, the processing operation of the operation management apparatus 15 will be described.

Figure 9:
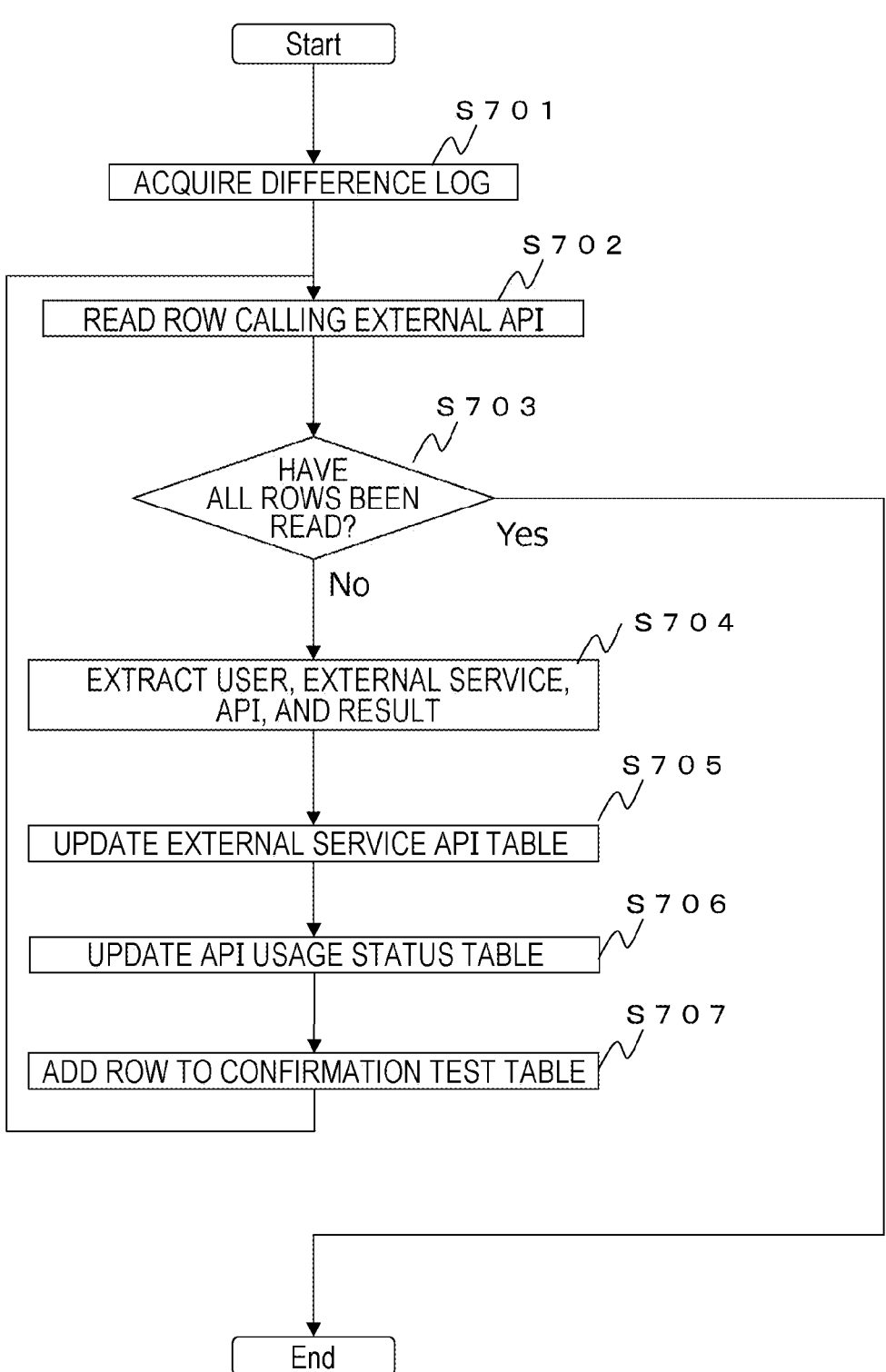
FIG. 9 is a flowchart of log monitoring processing according to one embodiment.

FIG. 9 is a flowchart of the log monitoring processing according to one embodiment.

The log monitoring processing is periodically executed, for example. The log monitoring program 304 (strictly speaking, the processor 21 that executes the log monitoring program 304) acquires a difference between logs specified as monitored targets by the log specifying program 303, that is, logs acquired the last time and thereafter (S701).

Here, with reference to the microservice table 313, the microservice specifying program 301 specifies the microservice calling an external service, and with a log file output by the specified microservice as a monitored target log, the log specifying program 303 gives the log monitoring program 304 a list of log files of this monitored target, or an extraction condition for extracting a log of the specified microservice from an application or a service that aggregates and holds the log files. The log monitoring program 304 acquires a difference of logs by the list of the log files or the extraction condition.

Next, the log monitoring program 304 reads one row calling the API of the external service 14 from the acquired log (S702). Here, the row calling the API of the external service can be judged by inclusion of the URL of the external service 14.

Next, the log monitoring program 304 determines whether or not all the rows of the log acquired in step S701 have been read (S703), and ends the processing if all the rows have been read (S703: Yes).

On the other hand, if not all the rows have been read (S703: No), that is, if there is a row that has called the API of the external service 14, a time, a user ID, an external service ID, an API, an operation type, and a result of calling the API of the external service are extracted based on the row (S704).

Here, the user ID can be extracted from a row specified as a row in which the transmission source information calling the API of the external service included in the row of the log matches the transmission source information of the transmission source 43 of the user table 311. The external service ID can be extracted from a row specified as a row of the external service table 312 in which a URL forward-matching the URL included in the row of the log is included in the URL 46. The API of the external service can be extracted by removing the URL of the external service from the URL included in the row of the log. Note that the result of calling the external service via the API in the present embodiment is a status code (e.g., 200, 500, or the like) that is a return value when REST API is called by HTTP, for example.

Next, the log monitoring program 304 compares the combination of the external service ID, the API of the external service, and the operation type extracted in step S704 with the combination of the external service ID, the API, and the operation type in the row of the external service API table 315, and inserts a row including the combination of the external service ID, the API, and the operation type into the external service API table 315 when there is no row of the same combination (S705).

Next, the log monitoring program 304 compares the user ID, the external service ID, the API of the external service, and the result extracted in step S704 with the content of the API usage status table 316, and performs processing of updating the API usage status table 316 (S706).

Specifically, the log monitoring program 304 acquires, from the microservice table 313, a microservice ID that matches the external service ID extracted in step S704. Next, the log monitoring program 304 extracts, from the API usage status table 316, a row in which the user ID and the external service ID match. Next, the log monitoring program 304 extracts an external service ID corresponding to the microservice ID from the microservice table 313, and leaves a row including the extracted external service ID from the rows extracted from the API usage status table 316. Next, when the external service ID of the external service ID 62 in the remaining row is different from the external service ID extracted from the log, the log monitoring program 304 judges that the user has changed the external service used by the user, and stores a value ("FALSE" in this example) indicative of a previously used external service into the current usage 66 in the corresponding row of the API use state table 316. On the other hand, when there is a row in which the external service ID and the API are the same in the rows extracted from the API usage table 316, the result 64 of this row and the latest usage time 65 are updated to the information extracted from the log row. When there is not a row in which the external service ID and the API are the same in the rows extracted from the API usage table 316, the user ID extracted from the log is set to the user ID 61, the external service ID is set to the external service ID 62, the API is set to the API 63, the result is set to the result 64, the time acquired from the log is set to the latest usage time 65, and a row in which a value ("TRUE" in this example) indicative of the external service that is currently used (change destination) in the current usage 66 is set is inserted into the API usage table 316.

Next, in a case where a result indicating an abnormality on the external service 14 side (in this example, a value in 500s) is newly stored in the result 64 in the API usage status table 316, the log monitoring program 304 adds a new row to the confirmation test table 317, sets the values extracted from the log into the external service ID 81, the API 82, and the user ID 83 of the row, sets the time of that time point at the request time 84 (S707), and advances the processing to step S702 for reading the next row.

Next, the confirmation test processing will be described. The confirmation test processing is processing of executing a confirmation test for confirming whether or not an occurrence of a failure is reproduced without depending on the user.

Figure 10:
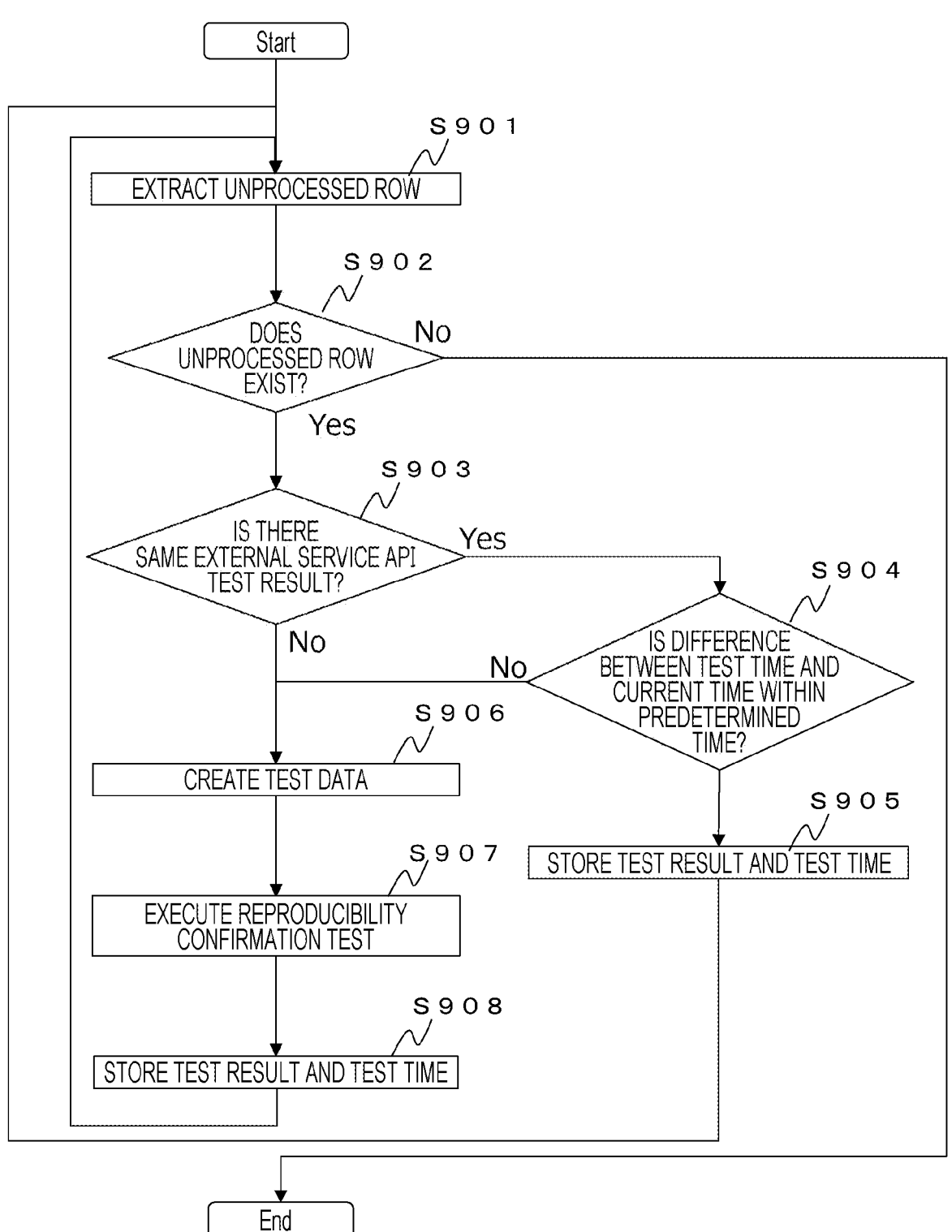
FIG. 10 is a flowchart of confirmation test processing according to one embodiment.

FIG. 10 is a flowchart of the confirmation test processing according to one embodiment.

The confirmation test processing is executed periodically (e.g., a cycle shorter than a cycle at which the log monitoring processing is executed), for example.

The confirmation test program 305 (strictly speaking, the processor 21 that executes the confirmation test program 305) extracts, from the confirmation test table 317, one row for which the confirmation test regarding the reproducibility of the occurrence of the failure has not been performed, that is, a row in which the result 85 is empty (S901), determines whether or not there is an unprocessed row (S902), and ends the processing if there is no unprocessed row (S902: No).

On the other hand, in a case where there is an unprocessed row (S902: Yes), the confirmation test program 305 acquires the external service ID of the external service ID 81 and the API of the API 82 from the extracted row (called a target row in the description of this processing), and searches whether or not there is a row having the same external service ID and API and storing a result in the confirmation test table 317 (S903).

As a result, if there is the corresponding row (S903: Yes), the confirmation test program 305 determines whether or not the difference between the time of the test time 86 of the corresponding row and the current time is within a predetermined period (S904).

As a result, in a case where the difference between the time of the test time 86 of the corresponding row and the current time is within the predetermined period (S904: Yes), it means that the result of a past confirmation test can be used, and therefore, the confirmation test program 305 stores the result of the result 85 of the corresponding row and the time of the test time 86 into the result 85 and the test time 86 of the target row (S905), respectively, and advances the processing to step S901.

On the other hand, if there is no corresponding row (S903: No) or if the difference between the time of the test time 86 of the corresponding row and the current time is not within the predetermined period (S904: No), the confirmation test program 305 creates test data for a confirmation test of reproducibility that determines whether or not the failure is reproduced (S906).

Here, the URL to be the destination of the test data is created by concatenating the URL of the URL 46 of the row in which the external service ID in the external service table 312 is the same as the external service ID of the target row and the API of the target row. The operation type when the test data is transmitted is the operation type of the type 55 of the row in which the external service ID and the API in the external service API table 315 match the external service ID and the API of the target row. As a specific argument in the test data, an argument stored in the test data table 319 is used.

Next, the confirmation test program 305 executes a confirmation test t for confirming whether or not the occurrence of the failure is reproduced by transmitting the test data to the target external service 14 (S907). Next, the confirmation test program 305 stores the test result and the test time received from the external service 14 into the result 85 of the target row and the test time 86 in the confirmation test table 317 (S908), and advances the processing to step S901.

According to this confirmation test processing, it is possible to appropriately confirm whether a failure that has occurred in processing for a certain user is reproduced also in test data. This can appropriately confirm whether or not there is a high possibility that a failure occurs also in processing for another user.

Next, the influence range estimation processing will be described. The influence range estimation processing is processing of estimating a range of users who may be affected by a failure.

Figure 11:
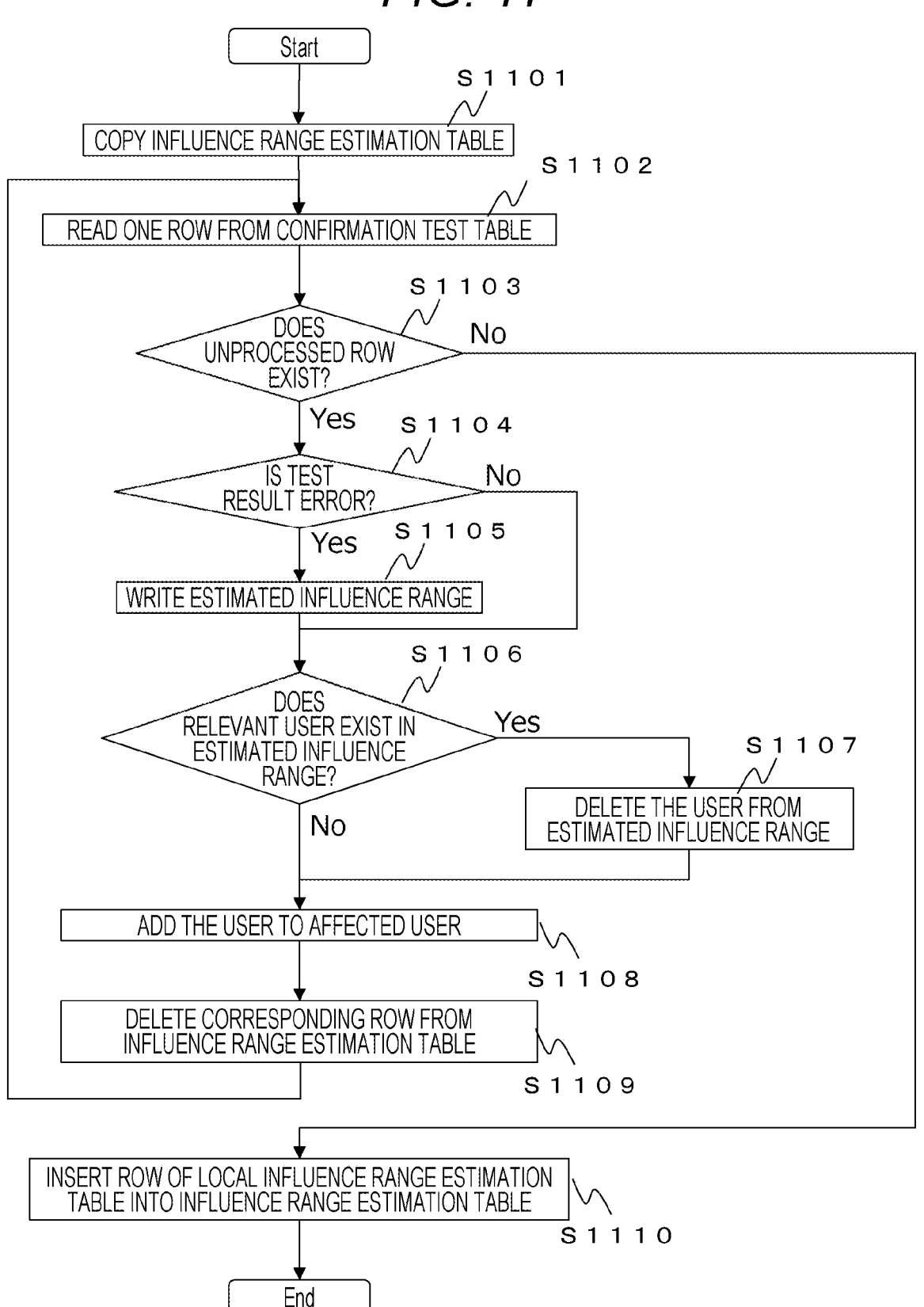
FIG. 11 is a flowchart of influence range estimation processing according to one embodiment.

FIG. 11 is a flowchart of the influence range estimation processing according to one embodiment.

The influence range estimation processing is executed in a case where a new test result is set for the confirmation test table 317, for example.

The influence range estimation program 306 (strictly speaking, the processor 21 that executes the influence range estimation program 306) locally copies the influence range estimation table 318 (S1101). Note that, in the description of the present processing, the locally copied influence range estimation table 318 will be called a local influence range estimation table 318, and the fields in the row will be described using the same reference signs as the corresponding fields of the influence range estimation table 318.

Next, the influence range estimation program 306 reads one row of an unprocessed row from the confirmation test table 317 (S1102), determines whether or not there is an unprocessed row (S1103), and advances the processing to step S1110 if there is no unprocessed row (S1103: No).

On the other hand, if there is an unprocessed row (S1103: Yes), the influence range estimation program 306 determines whether or not the result of the result 85 of the row (called a read row in the description of this processing) read in step S1102 is an error (S1104). In the present example, it is determined that it is an error of the external service 14 when the result is 500s indicative of being a failure on the external service 14 side, it is determined that it is an internal error of the system 11 when the result is 400s, and, it is determined that it is not an error when the result is otherwise.

As a result, if it is determined as an error on the external service 14 side (S1104: Yes), the influence range estimation program 306 acquires the user ID of another user who is using this external service 14 and the API. Specifically, the influence range estimation program 306 acquires, from the API usage status table 316, the user ID of the row in which the external service ID matches the external service ID of the read row, the API matches the API of the read row, and the current usage 66 is "TRUE", as the user ID of the other user who is using this external service and the API. Next, with reference to the microservice table 313, the influence range estimation program 306 specifies the microservice ID corresponding to the external service ID of the read row, and with reference to the external service API table 315, specifies the external table ID of the read row and the operation type corresponding to the API. Next, the influence range estimation program 306 specifies, from the local influence range estimation table 318, a row including a set of the external service ID and the API of the read row, the specified microservice ID, and the specified operation type. If there is no row corresponding to the local influence range estimation table 318, the influence range estimation program 306 newly creates a row including a set of the external service ID and API of the read row, the specified microservice ID, and the specified operation type. Next, the influence range estimation program 306 stores the user ID of the other user acquired in the estimated influence range 1007 of the specified row or the newly created row (called a target row in the present processing) of the local influence range estimation table 318. Here, in a case where the user ID of the other user overlaps the user ID already stored in the affected user 1006 and the estimated influence range 1007, that user ID is not stored. Here, in a case where there are a plurality of user IDs of other users, for example, the user IDs are separated by commas and stored. The influence range estimation program 306 also stores "FALSE" into the intra-company error 1005 (S1105).

When determining as an internal error of the system 11 (S1104: Yes), the influence range estimation program 306 specifies the user IDs of all users who are using the external service 14 and the API from the API usage status table 316, and with reference to the microservice table 313, the influence range estimation program 306 specifies the microservice ID corresponding to the external service ID of the read row, and with reference to the external service API table 315, specifies the external table ID of the read row and the operation type corresponding to the API. Next, the influence range estimation program 306 specifies, from the local influence range estimation table 318, a row including a set of the external service ID and the API of the read row, the specified microservice ID, and the specified operation type. If there is no row corresponding to the local influence range estimation table 318, the influence range estimation program 306 newly creates a row including a set of the external service ID and API of the read row, the specified microservice ID, and the specified operation type. Next, the influence range estimation program 306 stores the user ID of the other user acquired in the estimated influence range 1007 of the specified row or the newly created row (this row is also the target row in the present processing) of the local influence estimation table 318. Next, the influence range estimation program 306 stores all the user IDs specified for the affected users 1006 of the target row of the local influence range estimation table 318, and stores "TRUE" in the intra-company error 1005 (S1105).

On the other hand, if it is determined not to be an error (S1104: No), the influence range estimation program 306 advances the processing to step S1106.

In step S1106, the influence range estimation program 306 determines whether or not the user ID of the read row exists in the estimated influence range 1007 of the target row (S1106), and when it exists (S1106: Yes), deletes the user ID from the estimated influence range 1007 of the target row in the local influence range estimation table 318 (S1107), and advances the processing to step S1108. On the other hand, if the user ID of the read row does not exist in the estimated influence range 1008 (S1106: No), the influence range estimation program 306 advances the processing to step S1108.

In step S1108, the influence range estimation program 306 adds the user ID of the read row to the affected user 1006 of the target row (S1108). Next, the influence range estimation program 306 deletes the old row corresponding to the target row from the influence range estimation table 318 (S1109), and advances the processing to step S1102.

On the other hand, in step S1103, when no unprocessed row exists (S1103: No), the influence range estimation program 306 judges that the row existing in the local influence range estimation table 318 is a row with an ongoing failure, inserts each row to the end of the influence range estimation table 318 (step S1110), and ends the processing.

According to this processing, it is possible to appropriately estimate and manage the influence range (user) estimated to be affected by the external service ID and the API in which the error has occurred.

Next, the service state confirmation screen displayed by the service state presentation program 307 will be described. The service state confirmation screen may be displayed at all times, for example, or may be displayed in response to an instruction from the manager.

Figure 12A:
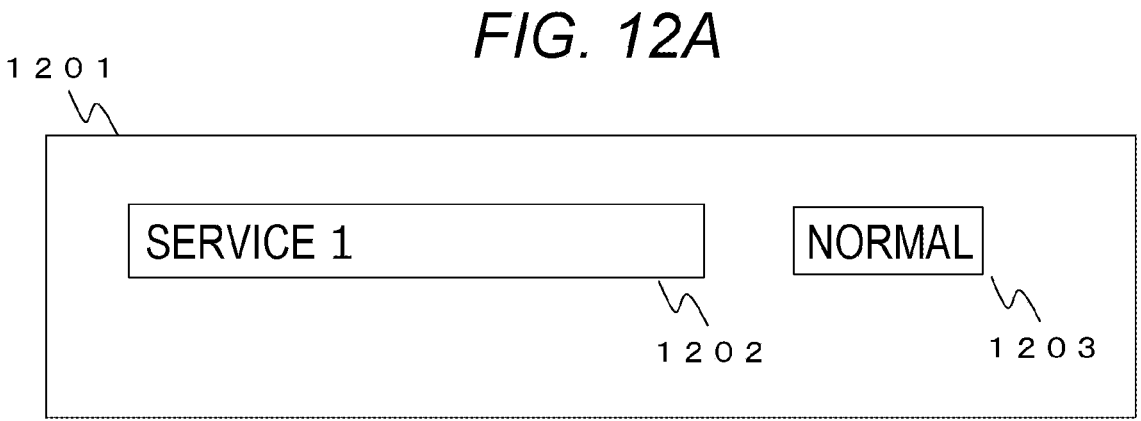
FIG. 12A is a configuration diagram of a first example of a service state confirmation screen according to one embodiment.

FIG. 12A is a configuration diagram of the first example of the service state confirmation screen according to one embodiment. The service state confirmation screen in FIG.

12 is a screen displayed when there is no abnormality in the system 11, that is, when no row is stored in the influence range estimation table 318.

The service state confirmation screen 1201 includes a service name display region 1202 and a state display region 1203. In the service name display region 1202, the name of the service 12 of a display target is displayed.

In the state display region 1203, the state of the service 12 f the display target, that is, normal or abnormal is displayed. When there is no abnormality in the system 11, that is, when no row is stored in the influence range estimation table 318, the service state presentation program 307 displays the service name in the service name display region 1202 and displays "normal" in the state display region 1203.

Figure 12B:
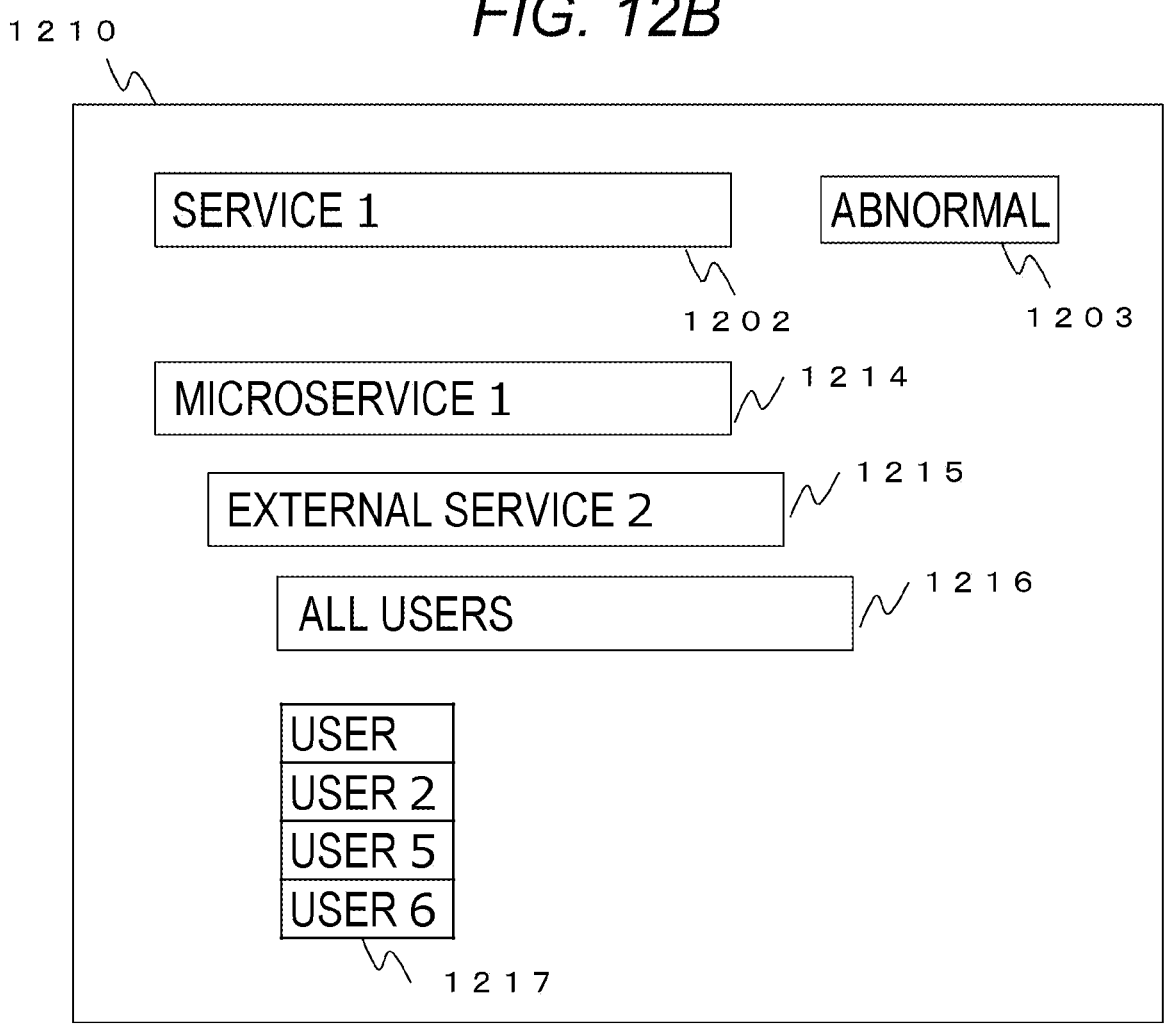
FIG. 12B is a configuration diagram of a second example of the service state confirmation screen according to one embodiment.

FIG. 12 is a configuration diagram of the second example of the service state confirmation screen according to one embodiment. The service state confirmation screen of FIG. 12B is a screen displayed when there is an abnormality inside the company, that is, on the microservice 12a side regarding the system 11, that is, a row is stored in the influence range estimation table 318, and the intra-company error 1005 of the row is TRUE.

A service state confirmation screen 1210 includes the service name display region 1202, the state display region 1203, a microservice name display region 1214, a failure occurrence external service display region 1215, a display user type display region 1216, and a detail display region 1217.

In the microservice name display region 1214, the microservice name of the microservice in which the abnormality is found is displayed. In the failure occurrence external service display region 1215, the name of the external service in which a failure has occurred is displayed. In the display user type display region 1216, the type of the user displayed in the detail display region 1217 is displayed. In the detail display region 1217, information of the user affected by the failure and/or in which the occurrence of a failure is estimated is displayed.

When there is an abnormality regarding the inside of the system 11, that is, a row is stored in the influence range estimation table 318, and the intra-company error 1005 in the row is TRUE, the service state presentation program 307 displays the service name in the service name display region 1202, displays "abnormal" in the state display region 1203, displays the microservice name in which the failure has occurred in the microservice name display region 1214, displays the external service name in which the failure has occurred in the failure occurrence external service display region 1215, and since the intra-company error is TRUE, that is, it is meant that there is a failure in the microservice calling the same external service ID, and all users who use this microservice are affected, displays "all users" in the display user type display region 1216, and displays the user name corresponding to the user ID of the affected user 1006 in the row of the influence range estimation table 318 in the detailed display region 1217.

According to this service state confirmation screen 1210, the manager can easily grasp the external service in which the failure has occurred and the affected user.

Figure 12C:
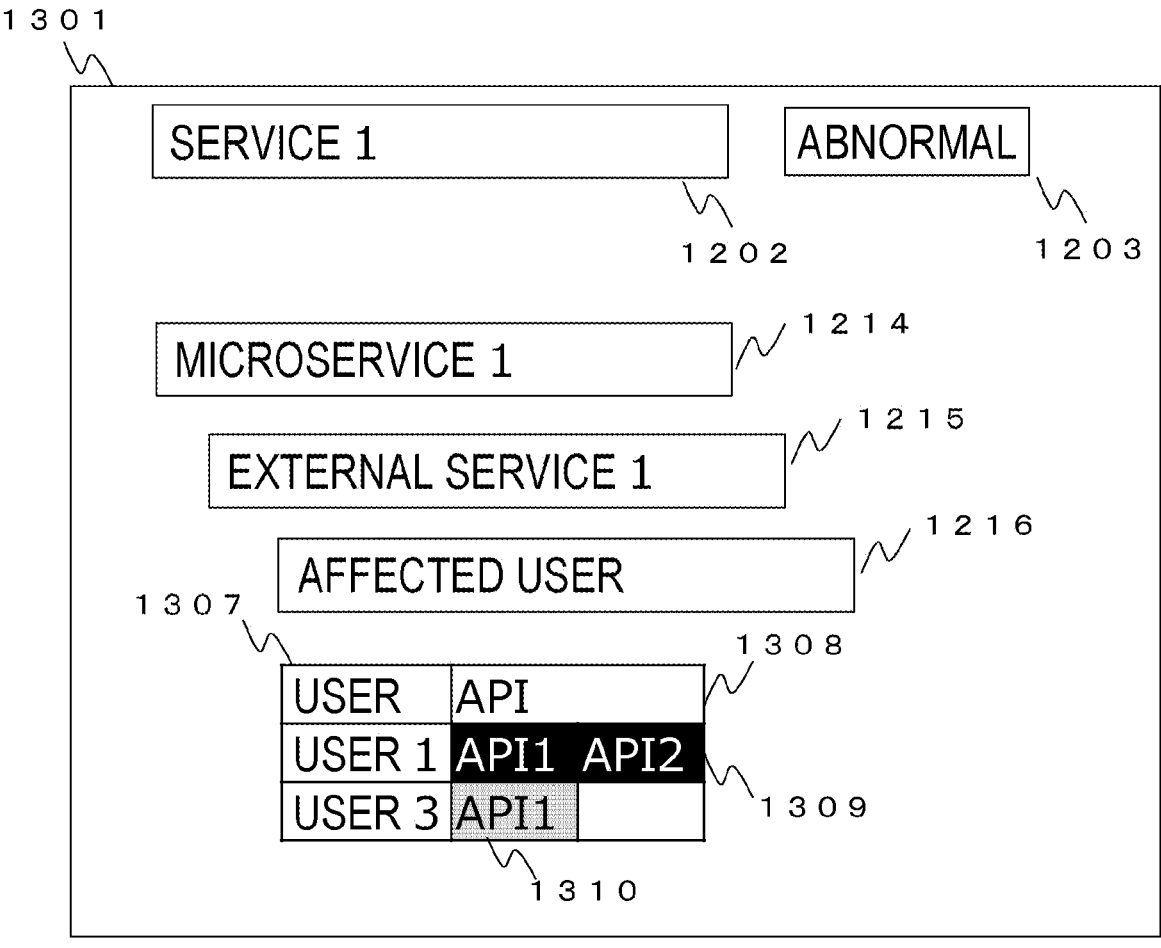
FIG. 12C is a configuration diagram of a third example of the service state confirmation screen according to one embodiment.

FIG. 12C is a configuration diagram of the third example of the service state confirmation screen according to one embodiment. The service state confirmation screen of FIG. 12C is an example of a screen displayed when there is an abnormality in the API or the external service side, that is, a row is stored in the influence range estimation table 318, and the intra-company error 1005 is FALSE.

A service state confirmation screen 1301 includes the service name display region 1202, the state display region 1203, the microservice name display region 1214, the failure occurrence external service display region 1215, the display user type display region 1216, a user display region 1307, and an API display region 1308.

In the user display region 1307, the user name affected by the failure and the user name in a range (influence estimation range) estimated to be affected by the failure are displayed. In the API display region 1308, the API used for the user affected by the failure or the API used for the user estimated to be affected by the failure is displayed.

Regarding the system 11, when there is an abnormality on the API or the external service side, that is, a row is stored in the influence range estimation table 318, and the intra-company error 1005 of the row is FALSE, the service state presentation program 307 displays the service name in the service name display region 1202, displays "abnormal" in the state display region 1203, displays the name of the microservice in which the failure has occurred in the microservice name display region 1214, and displays the name of the external service in which the failure has occurred in the failure occurrence external service display region 1215.

Furthermore, the service state presentation program 307 displays a character string ("affected user" in the present example) indicating that the users affected by the display user type display region 1216 are not necessarily all users, and displays, in the user display region 1307, the user name corresponding to the user ID of the affected user 1006 in the row of the influence range estimation table 318 and the user name corresponding to the user ID of the estimated influence range 1007. The service state presentation program 307 displays, in the API display region 1308, the API used by the user having the user name displayed in the user display region 1307, that is, the API of the API 1002 in the row. Here, the service state presentation program 307 displays an API 1309 used by the affected user and an API 1310 used by the user in the estimated influence range in a distinguishable display aspect. Note that the display aspect of the API in the API display region 1308 may be changed depending on the operation type in the API (the operation type of the type 1003 in the row). For example, in the update-related operation ("POST" in the present example) and the delete-related operation ("DELETE" in the present example), since the processing in the external service depends on the API call history so far in the processing of each user who uses the external service, even if the result of the confirmation test in the operation management apparatus 15 is successful, the possibility of being an abnormality in the processing of another user is higher than that in the reference-related operation ("GET" in the present example) and the creation-related operation ("POST" in the present example). Therefore, the display aspect (e.g., the display color is dark) in which the API for performing the update-related operation and the delete-related operation is emphasized as compared with the API for performing the reference-related operation and the creation-related operation may be adopted.

According to this service state confirmation screen 1301, the manager can easily grasp the external service in which the failure has occurred, the affected user and the API used, and the user who can be affected and the API used.

Note that the present invention is not limited to the above-described embodiment, and appropriate modifications can be carried out without departing from the gist of the present invention.

For example, in the above embodiment, the service state presentation program 307 may notify the user with the user ID of the affected user 1006 in the influence range estimation table 318 and/or the user ID of the estimated influence range 1007 that a failure has occurred or that a failure is estimated to occur, for example, transmit the notification to the user terminal of the user.

Reference Signs List

1 computer system
11 process information management apparatus
12 service
12*a* microservice
13 user terminal
14 external service
15 operation management apparatus
21 processor
22 main memory
23 storage device

The invention claimed is:

1. An operation management apparatus that manages an operation of a system that provides a plurality of users with a provision service that requests processing from one or more call destination services via an application programming interface (API), the operation management apparatus comprising:

a processor; and a storage device, wherein the storage device stores test data for causing the call destination service to execute processing via the API, a call destination service that a user uses through the provision service, and a correspondence relationship between the call destination service and an API that the user uses, and the processor:

detects whether or not a failure has occurred on a call destination service side in the provision service for a particular user, executes, in a case of detecting the failure on the call destination service side, a confirmation test for confirming whether or not the failure on the call destination service side is reproduced via an API used when the failure occurred, using the test data, and specifies each affected user and each potentially affected user, in a case where the failure on the call destination service side is reproduced as a result of the confirmation test, wherein the processor identifies:

the particular user for whom the failure was detected;

each affected user currently using the call destination service and API combination where the failure is reproduced; and each potentially affected user who uses the call destination service and API combination where the failure is reproduced, and wherein the particular user, each affected user, and each potentially affected user are each among the plurality of users.

2. The operation management apparatus according to claim 1, wherein the call destination service is an external service provided by a third party different from a management entity of the system.

3. The operation management apparatus according to claim 1, wherein the processor detects that a call destination service that the user uses by a provision service has been changed, and causes the storage device to store a call destination service of a detected change destination as a call destination service that the user uses.

4. The operation management apparatus according to claim 1, wherein the processor causes the particular user, each affected user, and each potentially affected user to be displayed in a specifiable manner.

5. The operation management apparatus according to claim 4, wherein the processor displays the particular user, each affected user, and each potentially affected user in a distinguishable manner.

6. The operation management apparatus according to claim 1, wherein the storage device stores an operation type to a call destination service by an API, and wherein the processor specifies an operation type by the API used and displays information specifying the API used in association with the user in a display aspect in accordance with the specified operation type.

7. The operation management apparatus according to claim 6, wherein the processor displays information specifying an API of which an operation type to a call destination service is an update-related operation or a delete-related operation in a more emphasized manner than information specifying an API of which an operation type to a call destination service is a reference-related operation or a creation-related operation, wherein update-related operation and delete-related operation include operations that modify or remove data in the call destination service, wherein reference-related operation and creation-related operation include operations that retrieve or add data without modifying existing data, and wherein a single operation type may perform multiple functions.

8. The operation management apparatus according to claim 1, wherein the processor notifies the particular user, each affected user, and each potentially affected user of information regarding occurrence of a failure.

9. The operation management apparatus according to claim 1, wherein, in a case where a predetermined period or less has passed since performance of the confirmation test for a call destination service in which the failure has occurred, the processor uses a result of the confirmation test performed within the predetermined period without executing a confirmation test.

10. The operation management apparatus according to claim 1, wherein the processor monitors a log file output by a microservice that calls the call destination service to detect the failure, and wherein the log file includes a uniform resource locator (URL) of the call destination service, a user identifier, and a status code returned from the call destination service.

11. The operation management apparatus according to claim 1, wherein the processor distinguishes between an internal error occurring within the system and an external error occurring on the call destination service side based on the result of the confirmation test, and wherein the processor specifies all users using a microservice that calls the call destination service when the internal error is detected.

12. The operation management apparatus according to claim 1, wherein the storage device stores a microservice table that identifies each microservice calling the call destination service, and wherein the processor uses the microservice table to determine which microservice is affected by the failure on the call destination service side.

13. The operation management apparatus according to claim 1, wherein the processor updates a current usage status in the storage device to indicate whether each user is currently using the call destination service and API combination where the failure is reproduced, and wherein the processor identifies each affected user based on the current usage status indicating current use of the call destination service and API combination.

14. An operation management method by an operation management apparatus that manages an operation of a system that provides a plurality of users with a provision service that requests processing from one or more call destination services via an application programming interface (API), wherein the operation management apparatus:

stores test data for causing the call destination service to execute processing via the API, a call destination service that a user uses through the provision service, and a correspondence relationship between the call destination service and an API that the user uses, detects whether or not a failure has occurred on a call destination service side in the provision service for a particular user, executes, in a case of detecting the failure on the call destination service side, a confirmation test for confirming whether or not the failure on the call destination service side is reproduced via an API used when the failure occurred, using the test data, and specifies each affected user and each potentially affected user, in a case where the failure on the call destination service side is reproduced as a result of the confirmation test, wherein the operation management apparatus identifies:
the particular user for whom the failure was detected;
each affected user currently using the call destination service and API combination where the failure is reproduced; and
each potentially affected user who uses the call destination service and API combination where the failure is reproduced, and
wherein the particular user, each affected user, and each potentially affected user are each among the plurality of users.

15. An operation management program for causing a computer to execute management of an operation of a system that provides a plurality of users with a provision service that requests processing from one or more call destination services via an application programming interface (API), wherein the computer stores test data for causing the call destination service to execute processing via the API, a call destination service that a user uses through the provision service, and a correspondence relationship between the call destination service and an API that the user uses, and the computer is caused to:

detect whether or not a failure has occurred on a call destination service side in the provision service for a particular user, execute, in a case of detecting the failure on the call destination service side, a confirmation test for confirming whether or not the failure on the call destination service side is reproduced via an API used when the failure occurred, using the test data, and specify each affected user and each potentially affected user, in a case where the failure on the call destination service side is reproduced as a result of the confirmation test, wherein the computer identifies:
the particular user for whom the failure was detected;
each affected user currently using the call destination service and API combination where the failure is reproduced; and
each potentially affected user who uses the call destination service and API combination where the failure is reproduced, and wherein the particular user, each affected user, and each potentially affected user are each among the plurality of users.

* * * * *